US011958456B2

United States Patent
Lee

(10) Patent No.: US 11,958,456 B2
(45) Date of Patent: Apr. 16, 2024

(54) ELECTRONIC PARKING BRAKE SYSTEM AND METHOD OF CONTROLLING THE SAME

(71) Applicant: HL MANDO CORPORATION, Pyeongtaek-si (KR)

(72) Inventor: ChanWon Lee, Uiwang-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 359 days.

(21) Appl. No.: 17/369,154

(22) Filed: Jul. 7, 2021

(65) Prior Publication Data

US 2022/0009470 A1    Jan. 13, 2022

(30) Foreign Application Priority Data

Jul. 7, 2020    (KR) .................. 10-2020-0083684

(51) Int. Cl.
*B60T 17/22* (2006.01)
*B60T 7/10* (2006.01)
*B60T 13/74* (2006.01)

(52) U.S. Cl.
CPC .......... *B60T 17/221* (2013.01); *B60T 7/107* (2013.01); *B60T 13/746* (2013.01)

(58) Field of Classification Search
CPC ........ B60T 17/221; B60T 17/22; B60T 7/107; B60T 7/122; B60T 7/12; B60T 13/746; B60T 13/741; B60T 13/74; B60T 2201/06; B60T 2201/10; B60T 8/17; B60T 8/3205; B60T 8/329; B60W 10/18; B60W 50/02; B60W 2050/0125; B60Y 2400/303; B60Y 2400/304; B60Y 2400/81
USPC .................................. 701/83, 78, 76, 71, 70
See application file for complete search history.

(56) References Cited

FOREIGN PATENT DOCUMENTS

| KR | 10-2014-0118415 A | 10/2014 |
|---|---|---|
| KR | 10-1526848 B1 | 6/2015 |
| KR | 10-1866030 B1 | 6/2018 |
| KR | 10-2019-0050239 A | 5/2019 |

*Primary Examiner* — Hai H Huynh
(74) *Attorney, Agent, or Firm* — LEE, HONG, DEGERMAN, KANG & WAIMEY

(57) ABSTRACT

Provided is an electronic parking brake system including: an electronic parking brake configured to provide a clamping force required for parking a vehicle by a motor; and a controller electrically connected to the motor, wherein the controller is configured to, in response to the electronic parking brake being in a parking release state or in a parking stop state and a transmission position being in a P-stage, identify whether a rollback occurs in the vehicle, and upon determining that a rollback has occurred in the vehicle, operate the electronic parking brake to park the vehicle.

15 Claims, 5 Drawing Sheets

I

ELECTRONIC PARKING BRAKE SYSTEM AND METHOD OF CONTROLLING THE SAME

CROSS-REFERENCE TO RELATED APPLICATION(S)

This application is based on and claims priority under 35 U.S.C. § 119 to Korean Patent Application No. 10-2020-0083684, filed on Jul. 7, 2020, in the Korean Intellectual Property Office, the disclosure of which is incorporated by reference herein in its entirety.

BACKGROUND

1. Field

The present disclosure relates to an electronic parking brake system capable of preventing a rollback accident of a vehicle, and a method of controlling the same.

2. Description of the Related Art

In general, an electronic parking brake system includes an electronic parking brake having a motor and a controller configured to drive the electronic parking brake, and the controller drives the electronic parking brake to generate a clamping force required for parking. For example, the electronic parking brake system increases a torque generated from the motor through a reducer to generate the damping force required for parking by a mechanical structure device inside a caliper.

Conventionally, when a vehicle is parked in a state in which the electronic parking brake is released, there is a possibility that a rollback of the vehicle occurs. In the case of an internal combustion engine vehicle without having a physical locking device (e.g., a parking pawl) in a transmission system or an electric vehicle without having an electrical/physical locking device in a motor drivetrain, even if the transmission position is indicated as P, a rollback of the vehicle may occur.

SUMMARY

It is an aspect of the disclosure to provide an electronic parking brake system and a method of controlling the same that are capable of preventing a vehicle rollback accident by securing the stability of the vehicle.

Additional aspects of the disclosure will be set forth in part in the description which follows and, in part, will be obvious from the description, or may be learned by practice of the disclosure.

In accordance with an aspect of the disclosure, there is provided with an electronic parking brake system including: an electronic parking brake configured to provide a vehicle with a clamping force required for parking by a motor; and a controller electrically connected to the motor, wherein the controller is configured to, in response to a transmission position being a P-stage, wherein the controller is configured to, in response to the electronic parking brake being in a parking release state or in a parking stop state and a transmission position being in a P-stage, identify whether a rollback of the vehicle occurs, and in response to identifying that a rollback of the vehicle has occurred, operate the electronic parking brake to park the vehicle.

The controller may be configured to identify whether a rollback of the vehicle occurs in response to the vehicle being identified as an electric vehicle based on vehicle drivetrain information of the vehicle.

The controller may be configured to identify whether a rollback of the vehicle occurs in response to the vehicle being identified as an electric vehicle without having an electrical or physical locking device in a motor drivetrain based on the vehicle drivetrain information of the vehicle.

The controller may be configured to identify whether a rollback of the vehicle occurs based on at least one of a vehicle speed, a wheel speed, or a longitudinal acceleration of the vehicle.

The controller may be configured to, in response to the vehicle speed being greater than a predetermined vehicle speed, identify that a rollback of the vehicle occurs.

The controller may be configured to, in response to the wheel speed being greater than a predetermined wheel speed, identify that a rollback of the vehicle occurs.

The controller may be configured to, in response to the longitudinal acceleration being greater than a predetermined longitudinal acceleration, identify that a rollback of the vehicle occurs.

When the electronic parking brake is operated to park the vehicle, the controller may be configured to perform a static parking operation by continuously rotating the motor only in a parking operation direction to maintain an engaged state.

When the electronic parking brake is operated to park the vehicle, the controller may be configured to perform a dynamic parking operation by continuously rotating the motor alternately in a parking operation direction and a parking release direction, and then rotating the motor in the parking operation direction to maintain an engaged state.

The controller may be configured to perform a static parking operation on the electronic parking brake, and in response to a rollback of the vehicle having occurred even with the static parking operation, perform a dynamic parking operation on the electronic parking brake.

In accordance with an aspect of the disclosure, there is provided with a method of controlling an electronic parking brake system including an electronic parking brake configured to provide a vehicle with a clamping force required for parking by a motor, the method including: identifying whether the electronic parking brake is in a parking release state or in a parking stop state and a transmission position is in a P-stage; in response to identifying that the electronic parking brake is in a parking release state or in a parking stop state and the transmission position is in a P-stage, identifying whether a rollback of the vehicle occurs; and in response to identifying that a rollback of the vehicle has occurred, operating the electronic parking brake to park the vehicle.

The identifying of whether a rollback of the vehicle occurs may include: in response to identifying that the electronic parking brake is in a parking release state or in a parking stop state and the transmission position is in a P-stage, identifying whether the vehicle is an electric vehicle based on vehicle drivetrain information of the vehicle; and in response to identifying that the vehicle is an electric vehicle, identifying whether a rollback of the vehicle occurs.

The identifying of whether the vehicle is an electric vehicle may include identifying whether the vehicle is an electric vehicle without having an electrical or physical locking device in a motor drivetrain based on the vehicle drivetrain information of the vehicle.

The identifying of whether a rollback of the vehicle occurs may include identify whether a rollback of the vehicle occurs based on at least one of a vehicle speed, a wheel speed, or a longitudinal acceleration of the vehicle.

The operating of the electronic parking brake to park the vehicle may include performing a static parking operation by continuously rotating the motor only in a parking operation direction to maintain an engaged state.

The operating of the electronic parking brake to park the vehicle may include performing a dynamic parking operation by continuously rotating the motor alternately in a parking operation direction and a parking release direction, and then rotating the motor in the parking operation direction.

The operating of the electronic parking brake to park the vehicle may include performing the static parking operation on the electronic parking brake, and in response to a rollback of the vehicle having occurred even with the static parking operation, performing the dynamic parking operation on the electronic parking brake

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
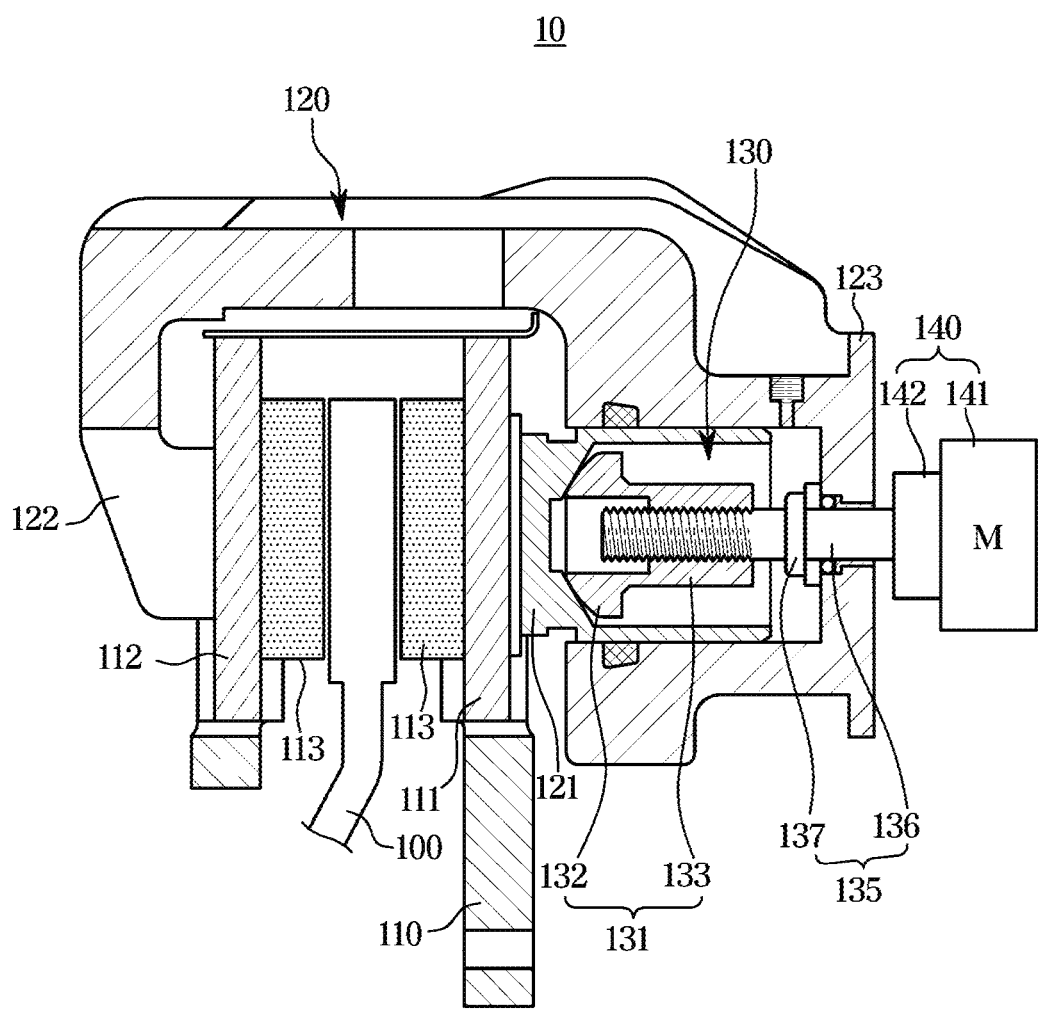
FIG. 1 is a block diagram illustrating an electronic parking brake included in an electronic parking brake system according to an embodiment.

Like reference numerals refer to like elements throughout the specification. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one element from another element, and the elements are not limited by the above-mentioned terms. The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

FIG. 1 is a block diagram illustrating an electronic parking brake included in an electronic parking brake system according to an embodiment.

Referring to FIG. 1, an electromechanical brake 10 may include a carrier 110 on which a pair of pad plates 111 and 112 are installed to move forward and backward to press a brake disc 100 rotating together with a wheel of a vehicle, a caliper housing 120 provided with a cylinder 123 that is slidably installed on the carrier 110 and in which a piston 121 is installed to advance and retreat by braking hydraulic pressure, a power conversion unit 130 that pressurizes the piston 121, and a motor actuator 140 that transmits rotational force to the power conversion unit 130 using a motor (M).

The pair of pad plates 111 and 112 may be divided into an inner pad plate 111 disposed to contact the piston 121 and an outer pad plate 112 disposed to contact a finger portion 122 of the caliper housing 120. The pair of pad plates 111 and 112 are installed on the carrier 110 fixed to the vehicle body so as to advance and retreat toward both sides of the brake disk 100. In addition, a brake pad 113 may be attached to one surface of each of the pad plates 111 and 112 facing the brake disk 100.

The caliper housing 120 may be slidably installed on the carrier 110. The caliper housing 120 may include the cylinder 123 in which the power conversion unit 130 is installed at the rear portion thereof and the piston 121 is capable of moving forward and backward, and the finger portion 122 formed to be bent in a downward direction to operate the outer pad plate 112 in the front portion. The finger portion 122 and the cylinder 123 are formed integrally.

The piston 121 may be provided in a cylindrical shape having a cup shape and is inserted into the cylinder 123 so as to be slidable. The piston 121 may press the inner pad plate 111 toward the brake disk 100 by the axial force of the power conversion unit 130 receiving the rotational force of the motor actuator 140. Accordingly, when the axial force of the power conversion unit 130 is applied, the piston 121 advances toward the inner pad plate 111 to press the inner pad plate 111, and the caliper housing 120 operates in a direction opposite to the piston 121 by reaction force, so that the finger portion 122 presses the outer pad plate 112 toward the brake disk D to perform braking.

The power conversion unit 130 may serve to press the piston 121 toward the inner pad plate 111 by receiving rotational force from the motor actuator 140.

The power conversion unit 130 may include a nut member 131 installed so as to be disposed in the piston 121 and in contact with the piston 121, and a spindle member 135 screwed to the nut member 131.

The nut member 131 may be disposed in the piston 121 in a state in which rotation is restricted, and may be screwed with the spindle member 135.

The nut member 131 may be formed by a head portion 132 provided to come into contact with the piston 121, and a coupling portion 133 formed extending from the head portion 132 and having a female thread formed on the inner circumferential surface to be screwed with the spindle member 135.

The nut member 131 may move in a forward direction or a backward direction according to the rotation direction of the spindle member 135 and may serve to pressurize and release the piston 121. In this case, the forward direction may be a moving direction in which the nut member 131 approaches the piston 121. The reverse direction may be a direction in which the nut member 131 moves away from the piston 121. In addition, the forward direction may be a moving direction in which the piston 121 approaches the brake pad 113. The reverse direction may be a direction in which the piston 121 moves away from the brake pad 113.

The spindle member 135 may include a shaft portion 136 that penetrates the rear portion of the caliper housing 120 and rotates by receiving the rotational force of the motor actuator 140, and a flange portion 137 extending in the radial direction from the shaft portion 136. One side of the shaft portion 136 may be rotatably installed through the rear side of the cylinder 123, and the other side of the shaft portion 136 may be disposed in the piston 121. In this case, one side of the shaft portion 136 passing through the cylinder 123 is connected to the output shaft of a reducer 142 to receive the rotational force of the motor actuator 140.

The motor actuator 140 may include an electric motor 141 and a reducer 142.

The motor 141 may pressurize or release the piston 121 by moving the nut member 131 forward and backward by rotating the spindle member 135.

The reducer 142 may be provided between the output side of the motor 141 and the spindle member 135.

By having the above configuration, the electronic parking brake 10 may press the piston 121 by moving the nut member 131 by rotating the spindle member 135 in one direction using the motor actuator 140 in a parking operation mode. The piston 121 pressed by the movement of the nut member 131 presses the inner pad plate 111 to bring the brake pad 113 into close contact with the brake disk 100, thereby generating a clamping force.

In addition, the electronic parking brake 10 rotates the spindle member 135 in the opposite direction using the motor actuator 140 in a parking release mode, so that the nut member 131 pressed against the piston 121 may move backward. The pressure on the piston 121 may be released by the retreat movement of the nut member 131. When the pressure on the piston 121 is released, the clamping force generated by the brake pad 113 being separated from the brake disk 100 may be released.

Figure 2:
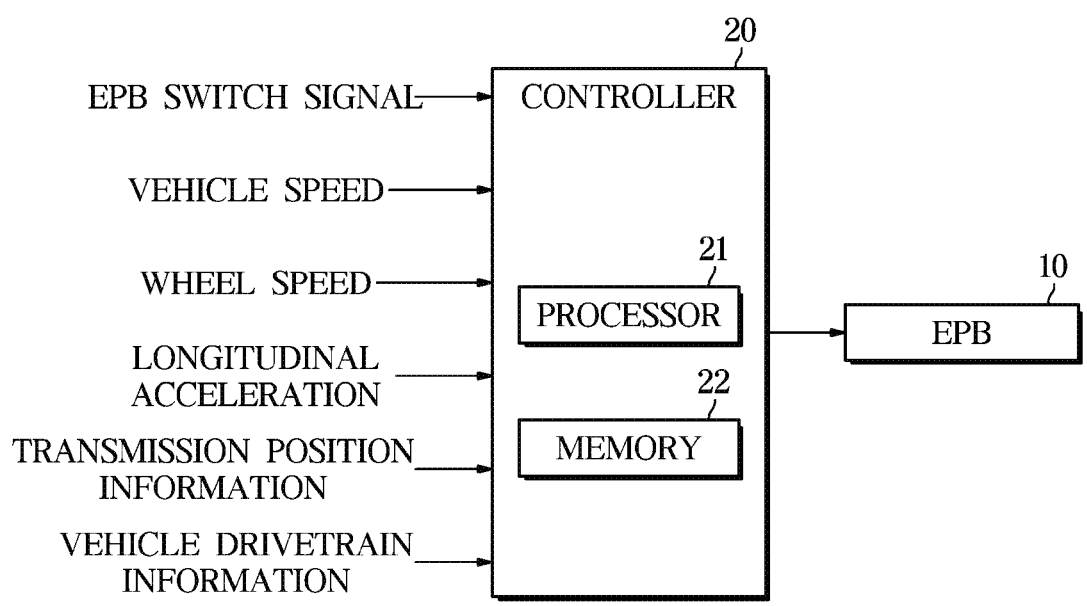
FIG. 2 is a control block diagram illustrating an electronic parking brake system according to an embodiment.

FIG. 2 is a control block diagram illustrating an electronic parking brake system according to an embodiment.

Referring to FIG. 2, the electronic parking brake system 200 may include an electronic parking brake 10 and a controller 20 electrically connected to the electronic parking brake 10.

The controller 20 may exchange data with various systems mounted in the vehicle through Ethernet, Media Oriented Systems Transport (MOST), Flexray, Controller Area Network (CAN), Local Interconnect Network (LIN), and the like.

The controller 20 may communicate with various systems mounted in the vehicle to receive a vehicle speed, a wheel speed, a longitudinal acceleration, transmission position information, vehicle drivetrain information, and the like. The controller 20 may directly detect the vehicle speed, the wheel speed, the longitudinal acceleration, the transmission position information, and the vehicle drivetrain information.

The controller 20 may drive the motor 141 of the electronic parking brake 10. The controller 20 may drive the motor 141 in a forward rotation direction or a reverse rotation direction. For example, the controller 20 may include an H-Bridge circuit including a plurality of power switching elements to drive the motor 141 in a forward rotation direction or a reverse rotation direction.

The controller 20 may drive the motor 141 by a manipulation signal of an EPB switch manipulated by the driver or a manipulation signal generated by a program related to the operation of the electronic parking brake.

The controller 20 may perform a parking operation mode or a parking release mode according to a manipulation signal of an EPB switch manipulated by the driver or a manipulation signal generated by a program related to the operation of the electronic parking brake.

The controller 20, in a parking operation mode, rotates the motor 141 in one direction to move the nut member 131 in a forward direction to press the piston 121, thereby bringing the brake pad 113 into close contact with the brake disc 100 to generate a clamping force so that a parking operation is performed. The controller 20, in a parking release mode, rotates the motor 141 in the opposite direction to move the nut member 131 in a reverse direction to release the pressure of the piston 121, thereby releasing the brake pad 113, which is in close contact with the brake disc 100, to release the generated clamping force so that a parking release may be performed.

The controller 20 may identify the current state of the electronic parking brake to determine whether the electronic parking brake 10 is in a parking operation state, a parking release state, or a parking stop state. The parking stop state may include a parking operation stop state or a parking release stop state due to an abnormal operation, and refer to a state in which the operation of the electronic parking brake 10 is stopped during a parking operation or during a parking release due to physical or other factors.

The electronic parking brake system according to an embodiment may be configured to, upon a rollback of the vehicle having occurred when the electronic parking brake 10 is in a parking release state or a parking stop state and the transmission position information is in P stage, operate the electronic parking brake to park the vehicle, thereby securing the stability of the vehicle and preventing a vehicle rollback accident.

In the electronic parking brake system according to an embodiment, the electronic parking brake 10 may be configured to, if the electronic parking brake 10 is in a parking release state or a parking stop state, the transmission position information is in a P stage, and the vehicle is an electric vehicle or an electric vehicle having no electric/physical locking device in a motor drivetrain, operate the electronic parking brake 10 to park the vehicle, thereby securing the stability of the vehicle and preventing a vehicle rollback accident.

The controller 20 may include a processor 21 and a memory 22.

The processor 21 may identify whether the electronic parking brake 10 is in a parking release state or a parking stop state based on operation information of the electronic parking brake 10. The processor 21 may check the operation information of the electronic parking brake 10 stored in the memory 22. The operation information of the electronic parking brake 10 may include parking operation information corresponding to a parking operation mode, parking release information corresponding to a parking release mode, and parking stop information corresponding to a parking stop mode. For example, the memory 22 may be an Electrically Erasable PROM (EEPROM) in which internal data is erasable by an electrical signal applied to one pin of a chip.

The processor 21 may be configured to, if the electronic parking brake 10 is in a parking release mode or a parking stop mode and the transmission position information is in the P stage, identify that the vehicle is suspected to rollback. The processor 21 may receive the transmission position information from another system in the vehicle performing CAN communication and check the transmission position information. The transmission position information may include a P (parking) stage, an R (reverse) stage, an N (neutral) stage, and a D (driving) stage. For example, the transmission position information may be displayed as a P (parking) stage, an R (reverse) stage, an N (neutral) stage, and a D (driving) stage in a cluster that is an instrument panel.

When the transmission position information is the P stage, the processor 21 may identify whether the vehicle is an electric vehicle (or an electric vehicle without having an electrical/physical locking device in a motor drivetrain) based on vehicle drivetrain information. The processor 21 may receive vehicle drivetrain information from another system in the vehicle performing CAN communication and check the received vehicle drivetrain information. The processor 21 may check vehicle drivetrain information stored in the memory 22. For example, the memory 22 may be an inactive memory in which data of an application program that is not currently used but recently used is recorded. The vehicle drivetrain information is information about the specifications of the vehicle, and may be information indicating whether the vehicle is an internal combustion engine vehicle using an engine drivetrain or an electric vehicle using a motor drivetrain (or an electric vehicle without having an electrical/physical locking device in a motor drivetrain).

If the vehicle is an electric vehicle or an electric vehicle without an electrical/physical locking device in a motor drivetrain, the processor 21 may identify that the vehicle is suspect to rollback and identify whether a rollback of the vehicle occurs.

The processor 21 may identify whether a rollback of the vehicle occurs based on any one of the vehicle speed, the wheel speed, and the longitudinal acceleration of the vehicle or a combination thereof.

When the vehicle speed is greater than a predetermined vehicle speed, the processor 21 may identify that a rollback of the vehicle occurs. The processor 21 may directly detect the vehicle speed through a vehicle speed sensor.

When the wheel speed of the vehicle is greater than a predetermined wheel speed, the processor 21 may identify that a rollback of the vehicle occurs. The processor 21 may directly detect the wheel speed through a wheel sensor.

When the longitudinal acceleration of the vehicle is greater than a predetermined acceleration, the processor 21 may identify that a rollback of the vehicle occurs. The processor 21 may directly detect the longitudinal acceleration through a longitudinal acceleration sensor.

The processor 21 may identify whether the vehicle speed, the wheel speed, and the longitudinal acceleration are in a fail state. The processor 21 may identify whether a rollback of the vehicle occurs based on at least one of a vehicle speed, a wheel speed, or a longitudinal acceleration that is not a fail state. The processor 21 may determine the order of priority for identifying whether the vehicle speed, wheel speed, and longitudinal acceleration are in a fail state, and sequentially identify a fail state of each one of the vehicle speed, wheel speed, and longitudinal acceleration corresponding to the determined order of priority.

Upon a rollback of the vehicle having occurred, the processor 21 may control the motor 141 through a motor driving part to operate the electronic parking brake 10 to park the vehicle. The processor 21 may transmit a motor driving signal for operating the electronic parking brake 10 to the motor driving part, and the motor driving part may drive the motor 141 based on the motor driving signal. The electronic parking brake 10 may generate a clamping force according to the driving of the motor 141.

The processor 21, when operating the electronic parking brake 10 to prevent a vehicle rollback, may perform a static parking operation or a dynamic parking operation on the electronic parking brake 10. The static parking operation is performed by continuously rotating the motor 141 only in a parking operation direction to maintain an engaged state. The dynamic parking operation is a method of varying the clamping force of the electronic parking brake 10, and is performed by continuously rotating the motor 141 alternately in a parking operation direction and a parking release direction, and then rotating the motor 141 in the parking operation direction to maintain an engaged state.

The processor 21 is a digital signal processor that processes vehicle speed, wheel speed, longitudinal acceleration, transmission position information, and vehicle drivetrain information, and may include a micro control unit (MCU) that generates a motor driving signal for a parking operation or parking release of the electronic parking brake 10.

The memory 22 includes a program and/or data used for the processor 21 to process vehicle speed, wheel speed, longitudinal acceleration, transmission position information, and vehicle drivetrain information, and a program and/or data for generating a motor drive signal to perform parking operation or parking release of the electronic parking brake 10.

The memory 22 may temporarily store the vehicle speed, wheel speed, longitudinal acceleration, transmission position information, and vehicle drivetrain information, and temporarily store a result of processing the vehicle speed, wheel speed, longitudinal acceleration, transmission position information, and vehicle drivetrain information by the processor 21.

The memory 22 includes not only volatile memories, such as S-RAM and D-RAM, but also non-volatile memories, a flash memory, a read only memory (ROM), an erasable programmable read only memory (EPROM), etc.

The electronic parking brake system may be applied to an internal combustion engine vehicle using an engine drivetrain, and may be applied to an electric vehicle using a motor drivetrain.

Figure 3:
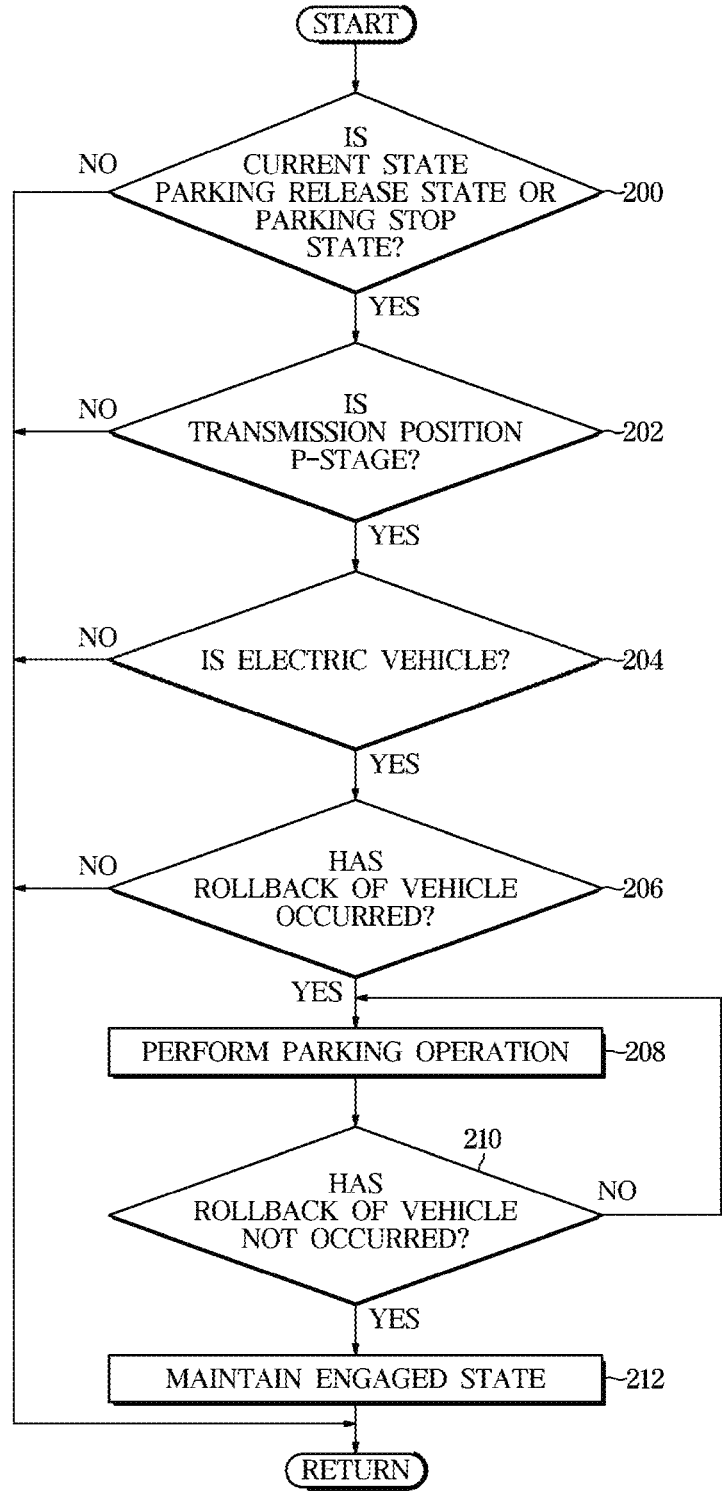
FIG. 3 is a control flowchart of an electronic parking brake system according to an embodiment.

FIG. 3 is a control flowchart showing an electronic parking brake system according to an embodiment.

Referring to FIG. 3, first, the controller 20 identifies whether the current state of the electronic parking brake 10 is a parking release state or a parking stop state (200). The controller 20 identifies whether the electronic parking brake 10 is in a parking release state or a parking stop state according to the operation information of the electronic parking brake 10.

In addition, the controller 20 identifies whether the transmission position is a P-stage (202). The controller 20 identifies whether the transmission position is a P-stage according to the transmission position information.

Figure 4:
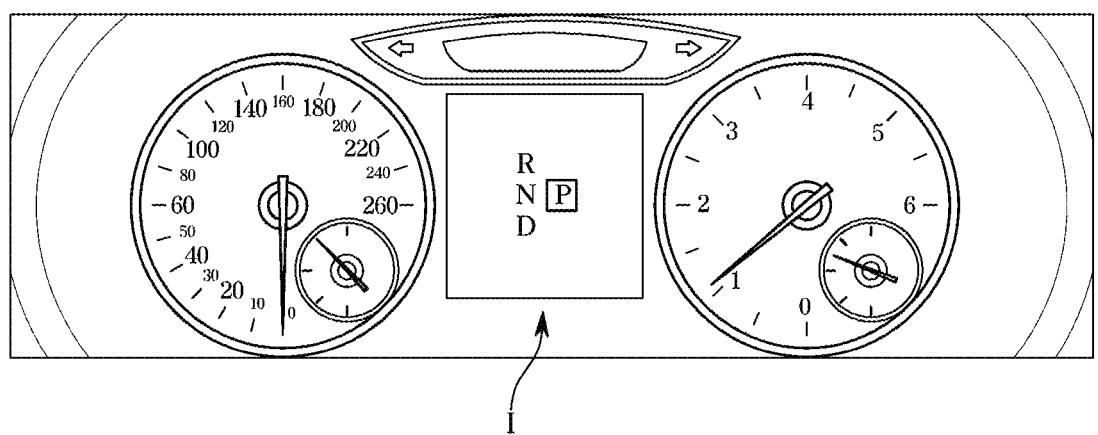
FIG. 4 is a diagram illustrating transmission position information of P stage displayed on a dashboard of a vehicle that employs an electronic parking brake system according to an embodiment.

FIG. 4 is a diagram illustrating transmission position information of a P stage displayed on a dashboard of a vehicle that employs an electronic parking brake system according to an embodiment.

Referring to FIG. 4, transmission position information I is displayed on a cluster that is an instrument panel of the vehicle. The transmission position information I, such as a P-stage, an R-stage, an N-stage, and a D-stage, may be displayed on the cluster according to the transmission position. A lamp corresponding to the transmission position may be turned on so that the driver may check the current transmission position. FIG. 4 shows a case where the transmission position is a P-stage.

Referring again to FIG. 3, the controller 20 identifies whether the vehicle is an electric vehicle (204). The controller 20 identifies whether the current vehicle is an internal combustion engine vehicle or an electric vehicle (or an electric vehicle without having an electric/physical locking device in a motor drivetrain) according to the vehicle drivetrain information.

If the current state of the electronic parking brake 10 is a parking release state or a parking stop state, the transmission position is a P-stage, and the vehicle is an electric vehicle, the controller 20 may identify that there is a possibility that a rollback of the vehicle occurs. In the case of an electric vehicle, particularly, an electric vehicle without having an electrical/physical locking device in a motor drivetrain, even if the transmission position is indicated as a P-stage, the motor drivetrain is in a state of not being locked, and thus a rollback of the vehicle may occur. Even if such an electrical/physical locking device exists, but has a malfunction or fault, a sufficient locking force may not be generated and thus a rollback of the vehicle may occur. That is, in such a vehicle, a rollback may occur even in the transmission position of a P-stage. Similarly, as for an internal combustion engine vehicle, a rollback of the vehicle may occur to a lesser extent though. In this case, even when the current state of the electronic parking brake 10 is a parking release state or a parking stop state, and the transmission position is a P stage, the controller 20 may identify that there is a possibility that a rollback of the vehicle occurs and identify whether a rollback of the vehicle occurs.

When the current state of the electronic parking brake 10 is a parking release state or a parking stop state, the transmission position is a P stage, and the vehicle is an electric vehicle, the controller 20 identifies that there is a possibility that a rollback of the vehicle occurs, and identifies whether a rollback of the vehicle occurs (206). The controller 20 may identifies whether a rollback of the vehicle occurs based on any one of the vehicle speed, the wheel speed, and the longitudinal acceleration of the vehicle or a combination thereof.

Figure 5:
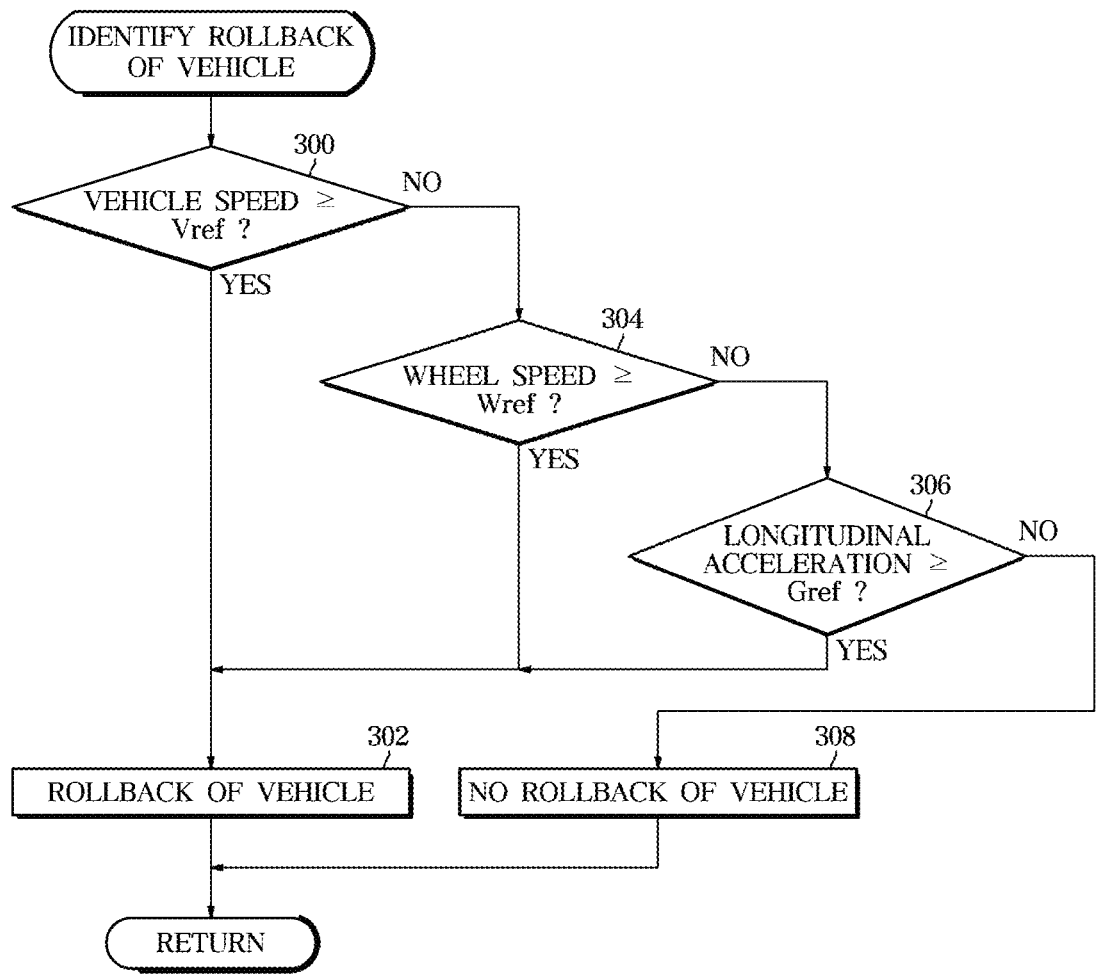
FIG. 5 is a diagram showing a method of determining whether a rollback of a vehicle occurs in an electronic parking brake system according to an embodiment.

FIG. 5 is a diagram showing a method of determining whether a rollback of a vehicle occurs in an electronic parking brake system according to an embodiment.

Referring to FIG. 5, the controller 20 identifies whether a vehicle speed is equal to or greater than a predetermined vehicle speed Vref (300), and when the vehicle speed is equal to or greater than the predetermined vehicle speed Vref (YES in operation 300, identifies that a rollback of the vehicle has occurred (302).

In addition, the controller 20 identifies whether the wheel speed is equal to or greater than a predetermined wheel speed Wref (304), and when the wheel speed is equal to or greater than the predetermined wheel speed Wref (YES in operation 304), the controller 20 identifies that a rollback of the vehicle has occurred (302).

In addition, the controller 20 identifies whether the longitudinal acceleration is equal to or greater than a predetermined acceleration Gref (306), and when the longitudinal acceleration is equal to or greater than the predetermined acceleration Gref (YES in operation 306), the controller 20 identifies that a rollback of the vehicle has occurred (302).

Meanwhile, when the vehicle speed, the wheel speed, and the longitudinal acceleration are less than the respective reference values Vref, Wref, and Gref (NO in operations 300, 304, and 306), the controller 20 may identify that a rollback of the vehicle has not occurred.

In FIG. 5, the controller 20 is illustrated as identifying whether a rollback of the vehicle has occurred by comparing the respective reference values in the order of the vehicle speed, the wheel speed, and the longitudinal acceleration, but the present disclosure is not limited thereto, and the order of comparison of the vehicle speed, wheel speed, longitudinal accelerations is not limited thereto.

Referring again to FIG. 3, when a rollback of the vehicle has occurred (YES in operation 206), the controller 20 operates the electronic parking brake 10 to park the vehicle (208). The controller 20 may drive the motor 141 of the electronic parking brake 10 to rotate the motor 141 in the parking operation direction, thereby rotating the spindle member 135 in one direction to move the nut member 131 to press the piston. The piston 121 pressed by the movement of the nut member 131 presses the inner pad plate 111 to bring the brake pad 113 into close contact with the brake disc 100, thereby generating a clamping force.

After operating the electronic parking brake 10 to park the vehicle, the controller 20 identifies whether a rollback of the vehicle has not occurred (210). The controller 20 may identify whether a rollback of the vehicle has not occurred using any one the vehicle speed, wheel speed, and longitudinal acceleration or a combination thereof.

If a rollback of the vehicle has occurred (NO in operation 210), the controller moves to the operation mode 208 and performs the following operation modes.

On the other hand, when a rollback of the vehicle has not occurred, the controller 20 continues to maintain the current engaged state (212). When a rollback of the vehicle has not occurred, the controller 20 may complete the parking operation while maintaining the engaged state of the electronic parking brake 10.

When a rollback of the vehicle has initially occurred, the electronic parking brake 10 may be engaged by a static parking operation, and in response to a rollback of the vehicle occurring even after the static parking operation, the electronic parking brake 10 may be engaged by a dynamic parking operation.

Although the above-described embodiment has been illustrated as identifying whether the electronic parking brake 10 is in a parking release state or in a parking stop state, identifying whether the transmission position is in a P stage, and then identifying whether the vehicle is an electric vehicle, the order of the identifying operations is limited thereto. Any one of the identifying whether the electronic parking brake 10 is in a parking released state or a parking stop state, the identifying whether the transmission position is a P-stage, and the identifying whether the vehicle is an electric vehicle may be performed first.

As described above, the present disclosure may automatically operate the electronic parking brake even when a rollback of the vehicle occurs in a state in which the electronic parking brake is in a parking release state or a parking stop state, thereby preventing a vehicle rollback accident, and preventing a rollback from occurring even for an electric vehicle or an electric vehicle without having an electrical/physical locking device in a motor drivetrain.

Meanwhile, although the above embodiments has been described in relation on a motor-on-caliper type electronic parking brake, the present disclosure is not limited thereto, and the present disclosure may be applied to an electric drum brake in which a drum rotating together with a wheel is provided and a braking is performed by an expansion of a pair of brake shoes, on which brake linings (or brake pads) are attached.

In addition, although the above embodiments have been described with respect to an electronic parking brake system having a motor-on-caliper type electronic parking brake or having an electric drum brake, the present disclosure is not limited thereto. The electronic parking brake system may include: an Electro Mechanical Brake system that performs not only a service brake function for providing a braking force in a driving situation of the vehicle but also a parking brake function for maintaining the vehicle in a stop state when parking; an Electronic Stability Control device, and an Integrated Dynamic Brake system.

As is apparent from the above, a vehicle rollback accident can be prevented by securing the stability of the vehicle.

According to the present disclosure, even when a rollback of the vehicle occurs in a state in which the electronic parking brake is released, the electronic parking brake can automatically operate, thereby preventing a vehicle rollback accident.

The present disclosure can prevent a rollback of a vehicle even in a case of an electric vehicle without having an electrical/physical locking device in a motor drive system drivetrain.

What is claimed is:

1. An electronic parking brake system comprising:
   an electronic parking brake configured to provide a vehicle with a clamping force required for parking by a motor; and
   a controller electrically connected to the motor,
   wherein the controller is configured to, in response to the electronic parking brake being in a parking release state or in a parking stop state and a transmission position being in a P-stage, identify whether a rollback of the vehicle occurs, and in response to identifying that a rollback of the vehicle has occurred, operate the electronic parking brake to park the vehicle,
   wherein the controller is further configured to identify whether a rollback of the vehicle occurs based on at least one of a vehicle speed, a wheel speed, or a longitudinal acceleration of the vehicle.

2. The electronic parking brake system of claim 1, wherein the controller is configured to identify whether a rollback of the vehicle occurs in response to the vehicle being identified as an electric vehicle based on vehicle drivetrain information of the vehicle.

3. The electronic parking brake system of claim 2, wherein the controller is configured to identify whether a rollback of the vehicle occurs in response to the vehicle being identified as an electric vehicle without having an electrical or physical locking device in a motor drivetrain based on the vehicle drivetrain information of the vehicle.

4. The electronic parking brake system of claim 1, wherein the controller is configured to, in response to the vehicle speed being greater than a predetermined vehicle speed, identify that a rollback of the vehicle occurs.

5. The electronic parking brake system of claim 1, wherein the controller is configured to, in response to the wheel speed being greater than a predetermined wheel speed, identify that a rollback of the vehicle occurs.

6. The electronic parking brake system of claim 1, wherein the controller is configured to, in response to the longitudinal acceleration being greater than a predetermined longitudinal acceleration, identify that a rollback of the vehicle occurs.

7. The electronic parking brake system of claim 1, wherein when the electronic parking brake is operated to park the vehicle, the controller is configured to perform a static parking operation by continuously rotating the motor only in a parking operation direction to maintain an engaged state.

8. The electronic parking brake system of claim 1, wherein when the electronic parking brake is operated to park the vehicle, the controller is configured to perform a dynamic parking operation by continuously rotating the motor alternately in a parking operation direction and a parking release direction, and then rotating the motor in the parking operation direction to maintain an engaged state.

9. The electronic parking brake system of claim 1, wherein the controller is configured to perform a static parking operation on the electronic parking brake, and in response to a rollback of the vehicle having occurred even with the static parking operation, perform a dynamic parking operation on the electronic parking brake.

10. A method of controlling an electronic parking brake system including an electronic parking brake configured to provide a vehicle with a clamping force required for parking by a motor, the method comprising:
    identifying whether the electronic parking brake is in a parking release state or in a parking stop state and a transmission position is in a P-stage;
    in response to identifying that the electronic parking brake is in a parking release state or in a parking stop state and the transmission position is in a P-stage, identifying whether a rollback of the vehicle occurs; and
    in response to identifying that a rollback of the vehicle has occurred, operating the electronic parking brake to park the vehicle,
    wherein the identifying of whether a rollback of the vehicle occurs includes identify whether a rollback of the vehicle occurs based on at least one of a vehicle speed, a wheel speed, or a longitudinal acceleration of the vehicle.

11. The method of claim 10, wherein the identifying of whether a rollback of the vehicle occurs includes:
    in response to identifying that the electronic parking brake is in a parking release state or in a parking stop state and the transmission position is in a P-stage, identifying whether the vehicle is an electric vehicle based on vehicle drivetrain information of the vehicle; and
    in response to identifying that the vehicle is an electric vehicle, identifying whether a rollback of the vehicle occurs.

12. The method of claim 11, wherein the identifying of whether the vehicle is an electric vehicle includes identifying whether the vehicle is an electric vehicle without having an electrical or physical locking device in a motor drivetrain based on the vehicle drivetrain information of the vehicle.

13. The method of claim 10, wherein the operating of the electronic parking brake to park the vehicle includes performing a static parking operation by continuously rotating the motor only in a parking operation direction to maintain an engaged state.

14. The method of claim 10, wherein the operating of the electronic parking brake to park the vehicle includes performing a dynamic parking operation by continuously rotating the motor alternately in a parking operation direction and a parking release direction, and then rotating the motor in the parking operation direction.

15. The method of claim 14, wherein the operating of the electronic parking brake to park the vehicle includes
performing the static parking operation on the electronic parking brake, and in response to a rollback of the vehicle having occurred even with the static parking operation, performing the dynamic parking operation on the electronic parking brake.

\* \* \* \* \*